No. 867,166. PATENTED SEPT. 24, 1907.
H. W. SMITH.
GAS COCK.
APPLICATION FILED NOV. 14, 1906.

Witnesses
Frank B. Hoffman
Aimee Brown.

Inventor
Henry Wahl Smith
By Victor J. Evans
Attorney

UNITED STATES PATENT OFFICE.

HENRY WAHL SMITH, OF HADDONFIELD, NEW JERSEY.

GAS-COCK.

No. 867,166.    Specification of Letters Patent.    Patented Sept. 24, 1907.

Application filed November 14, 1906. Serial No. 343,433.

*To all whom it may concern:*

Be it known that I, HENRY WAHL SMITH, a citizen of the United States of America, residing at Haddonfield, in the county of Camden and State of New Jersey, have invented new and useful Improvements in Gas-Cocks, of which the following is a specification.

This invention relates to improvements in gas cocks such as used upon domestic lighting and other burners, and its object is to provide simple and efficient means for automatically locking the cock from movement when it is turned to closed position to cut off the flow of gas, thus preventing all danger of the gas being accidentally turned on when not lighted.

A further object is to provide an improved construction of lock which may be conveniently retracted when the key of the cock is grasped to turn said cock to open position.

Figure 1:
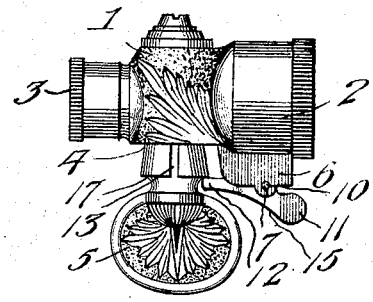
Figure 2:
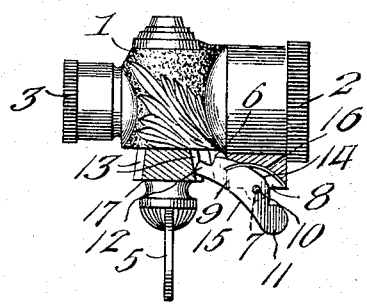
Figure 3:
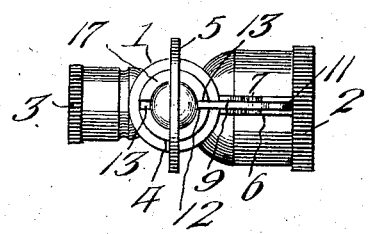

In the accompanying drawing,—Figure 1 is a side elevation of a cock constructed in accordance with my invention, showing the cock in open position. Fig. 2 is a similar view with parts in section, showing the cock locked in closed position. Fig. 3 is a bottom plan view of the cock with parts arranged as shown in Fig. 2.

Referring to the drawing, the numeral 1 designates the casing of the cock having inlet and outlet branches 2 and 3, and 4 designates a tapered cock journaled in the casing in the usual manner and provided at its lower end with a turning key 5.

In accordance with my invention, the inlet connection 2 is formed on its underside with an integral lug or boss 6 having a pair of depending ears 7 and formed with a recess 8 opening through its forward edge and through its base to a point near the rear end or edge thereof, the upper wall of the chamber being longitudinally or arcuately curved. The chamber 8 receives the body portion of a curved dog or latch 9, pivotally mounted on the pin 10 fixed in the ears 7. The lower rear end of the dog is shaped to provide a finger piece 11, while the forward end thereof is formed with a locking lug 12 adapted to engage diametrically opposite grooves or recesses 13 formed in the base of the cock to lock the latter against movement when turned in either direction to a closed position.

The upper edge of the dog is convexly curved or rounded, as shown at 14 to bear against the upper forward edge of the top wall of the recess when the dog is in locking position, so that it will have a maximum range of upward movement and will be retained securely in such position against shocks, jars or accidental blows. The lower edge of the dog is, on the contrary, concaved so as to form a finger recess 15 to accommodate the forefinger of the hand when such finger and the thumb are brought into position to grasp the key to turn the cock. A bowed or curved plate spring 16 lines the upper wall of the recess and is suitably fixed therein, and the forward end of the spring is bifurcated to straddle the dog and is suitably connected therewith to throw the locking end of the dog upward.

Normally the upper edge of the locking lug 12 bears against a shoulder 17 formed upon the lower end of the cock, so that when the cock is in open position the dog will be held retracted against the action of the spring. When the cock is turned in either direction to closed position the lug 12 rides on said shoulder until it comes into register with one of the grooves or recesses 13, when it will be projected thereinto by the action of the spring to lock the cock, which is then in closed position, against turning movement. Hence when the cock has been completely closed it will be held in closed position, thus preventing any possibility of the same being turned too far or back again sufficiently to allow the gas to escape. When it is desired to open the cock, the operator may grasp the key 5 in the thumb and forefinger of one hand and tilt the dog to release position by grasping or pressing upward on the finger piece 11 through the action of the thumb and forefinger or the thumb or either finger of the other hand, whereby the dog will be tilted to throw the lug 12 downward out of the groove 13, leaving the cock free to be turned. By the provision of the recessed portion 15, it will be understood that the necessity of using both hands in this operation is avoided as when the thumb and forefinger are in grasping position the operator may by moving the forefinger to a slight extent rearwardly press the dog to released position just prior to exerting turning movement on the key 5, leaving the other hand of the operator free to hold and apply the match to the burner.

Having thus described the invention, what is claimed as new, is:—

A gas cock comprising a casing having inlet and outlet branches, the latter being provided in its underside with a boss provided with a longitudinal recess having an upper curved wall formed at its forward end with a stop shoulder, the side walls of said recess being formed with depending lugs, a cock arranged to turn in the casing and provided below the same with a turn-key and above the key with an annular shoulder and diametrically opposite grooves extending downwardly therethrough, a dog comprising a plate of segmental form, terminating at its lower rear end in a finger piece and having an upper convex edge and a lower concaved edge, said dog being pivotally mounted upon the lugs to swing within the recess, the forward end of the said convex edge being adapted to engage said stop shoulder, said dog being provided at its forward end with a locking lug for coöperation with said annular shoulder and grooves, and adapted upon the retraction of the dog to engage and ride in contact with the underside of said shoulder, and a plate spring lining the upper curved wall of the recess and having a free forward end connected with the dog to draw said locking end of the dog upward.

In testimony whereof, I affix my signature in presence of two witnesses.

HENRY WAHL SMITH.

Witnesses:
WILLIAM MEYER,
ROBERT REICHL.